United States Patent [19]

Marzocchi et al.

[11] 4,265,563
[45] May 5, 1981

[54] ROAD PAVEMENT AND REPAIR

[75] Inventors: Alfred Marzocchi; Michael G. Roberts; Charles E. Bolen, all of Newark, Ohio

[73] Assignee: Owens-Corning Fiberglas Corporation, Toledo, Ohio

[21] Appl. No.: 74,378

[22] Filed: Sep. 10, 1979

Related U.S. Application Data

[62] Division of Ser. No. 778,415, Mar. 17, 1977, Pat. No. 4,175,978.

[51] Int. Cl.³ .............................................. E01C 11/04
[52] U.S. Cl. ......................................... 404/75; 404/47
[58] Field of Search ................... 404/75, 87, 74, 100, 404/47, 20, 68, 69, 72, 67, 18; 52/396; 14/16.5

[56] References Cited

U.S. PATENT DOCUMENTS

| | | | |
|---|---|---|---|
| 2,221,431 | 11/1940 | Omansky | 404/47 |
| 3,122,073 | 2/1964 | Masse | 404/18 X |
| 3,135,176 | 6/1964 | Foulger | 404/47 |
| 3,223,005 | 12/1965 | Carlson | 404/47 |
| 3,474,625 | 10/1969 | Draper | 404/47 X |
| 3,810,707 | 5/1974 | Tungseth | 404/67 |
| 3,838,931 | 10/1974 | Valla | 404/69 |
| 4,015,302 | 4/1977 | Clark | 404/69 X |
| 4,111,582 | 9/1978 | Tippett | 404/47 |
| 4,113,401 | 9/1978 | McDonald | 404/75 |
| 4,175,978 | 11/1970 | Marzocchi | 404/20 X |

Primary Examiner—Nile C. Byers, Jr.
Attorney, Agent, or Firm—Ronald C. Hudgens; Robert F. Rywalski; Keith V. Rockey

[57] ABSTRACT

The use of flake glass in road pavement and repair is disclosed. In particular, we disclose improvements in the formulations of asphalt aggregate wear surfaces, substrate layers and interface layers between the substrate and wear surfaces. In one embodiment we also employ an unsaturated monomer or an unsaturated elastomer.

1 Claim, 6 Drawing Figures

ROAD PAVEMENT AND REPAIR

This is a division of application Ser. No. 778,415, filed Mar. 17, 1977 now U.S. Pat. No. 4,175,978.

The present invention relates to improvements in road pavement and repair and particularly improvements in the formulations of asphalt aggregate wear surfaces, substrate layers, and to improved interface layers between the substrate and the wear surface.

A feature of the invention is the rigidifying of the wear coat of asphalt aggregate by the introduction of glass flake in the asphalt component of the wear surface composition to inhibit the flow of asphalt and impede the sinking of the aggregate and separation thereof, thus helping prevent an asphalt-rich surface which tends to become hazardous.

Another feature of the invention is the provision of glass flake to asphaltic compositions to resist oxidation of the asphalt and thus decrease brittleness and increase life of the pavement. Glass flake, being impervious to gases, helps prevent or impedes the passage of oxygen through the asphaltic wear course to oxidize and weaken the pavement.

Another feature of the invention involves the incorporation of glass flake in the asphaltic membrane to prevent or impede water or other fluid from descending through the asphalt aggregate in the membrane and reach the substrata layer which may be composed of cement reinforced with rebars (steel reinforcing bars) which would otherwise corrode over a short period of time. In the same way, the admixture of glass flake helps prevent the flow of water in asphaltic bridge sufaces and thus protects against corrosion of this underlying steel bridge structure or other supporting members.

Another feature of the invention is to provide an interface layer of glass flake reinforced asphaltic composition of sufficient thickness along with compression strength, resilience, and lateral strength to assist in stress distribution and decoupling the movement from the wear surface and the substrata layer. Such interface membrane may be provided with rubberized asphalt or asphalt having cross-linked binders of varying compositions.

Another feature of the invention is to sprinkle a thin layer of flake glass over the filling provided in the cracks of the substrate layer to assist in the decoupling action and movement of the wear surface and the substrate. The flake glass may be covered with an interface membrane to assist in the decoupling action of movement and the distribution of stresses from the wear surface into the substrate layer.

Other features of the invention involve treating the asphalt with elastomeric materials such as natural rubber or with dehydrohalogenated chlorobutyl elastomer or incorporation of vulcanizable asphalt in connection with the glass flake or such flake with glass fibers or roving and the reinforcement of the asphaltic composition by means of glass flake which has been surface treated to chemically alter the glass so that chemical bonding may occur between the glass surface and the asphaltic matrix resin, thus improving the properties of asphaltic composition such as creep resistance, oxidation resistance, permeability, strength, and similar properties. Another feature involves treating the glass flake on production forming thereof or subsequently with a mixture of amino silane and elemental sulfur to produce a glass surface in which the silane portion of the coupling agent has reacted with the glass thus leaving unreacted secondary or primary amine groups as well as free elemental sulfur dispersed over the glass surface which may be added to a resin system such as asphalt, tar, etc., in which alkyl aryl ketones are present so that the Kindler modification of the Willgerodt reaction occurs where the silane links to the glass surface. Various other treatments may be provided as will be described more fully to assist in the rigidifying and stabilization of the asphaltic aggregate or interface layers.

PRIOR ART

Glass fibers, due to their high tensile strength, high modulus, and low cost, have been used extensively in the reinforcement of resins, rubber, and asphalts. Pavement applications such as roads, driveways and bridges and walks, although having received considerable attention, have met with varying degrees of technical success but no extensively accepted commercial products. Bridge decking reinforcement has been tried with a woven ten feet by twenty feet continuous glass fiber scrim fabric in two layers which are combined to reinforce a membrane composed of pitch, aromatic oils, plasticized vinyl resins, and an inert talc filler. The resultant product is placed on the surface primer with the glass fabric side up and coated with an asphalt emulsion to produce a substrate for the asphalt aggregate which is then applied in the normal manner. In another application a glass fiber woven roving was impregnated with a solvent solution of butadiene styrene. The impregnated fabric was then laid on the adhesive asphalt layer of the road under repair. It was then pressed into the asphalt adhesive before the normal asphalt aggregate was applied as a top surface. This technique, however, did not prevent cracks from propagating from the bottom layer up through the top surface as a reflection cracking. One of the causes of failure resulted from the tremendous sheer forces at the interface, that is, the forces applying from the wear surface to the substrate through the interface. Failure was also accentuated during compression of the surface layer by vehicular traffic. Problems encountered also were due to stress concentration at the interface accompanied by a concentration of stress resulting from a movement of the aggregate in the surface layer which on compression from vehicular traffic would actually cut the glass yarn underneath, accentuated by vehicular traffic causing compression of the surface layer which in turn gradually causes a flow of the asphalt which tends to concentrate toward the top layer and leaving the aggregate accentuated on the bottom of the layer and assisting in puncturing of the interface that may have been applied. To minimize this migration, a lower percentage of asphalt may be used although this decreases the lubricant and flowing properties and makes the asphalt aggregate more compact and brittle. On the other hand, a higher percentage of asphalt promotes upward migration of the asphalt and flushing, causing hydroplaning and skidding in wet weather, a hazardous condition.

The foregoing invention aims to overcome the foregoing problems and provides a road construction or repair that is more durable, longer lasting, and safer over a period of time.

Glass flake has been proposed to be used in a laminate made from a plurality of sheets coated with thermoplastic or thermosetting resins or varnish having electrical properties or produced by laminating together sheets of glass fiber with sheets of cellulose fiber, rubber hydrochloride, or other plastic materials in sheet form as suggested in Slayter et al. U.S. Pat. No. 2,457,785.

Fulk U.S. Pat. No. 2,780,889 refers to single thickness film and flake for producing reinforcing materials for resin, rubber, asphalt, Portland cement, gypsum, and paper slurry.

Slayter et al. U.S. Pat. No. 2,970,127 shows glass flake in various forms admixed with cementitious materials such as gypsum or other plastic products.

Also suggested has been the use of glass flake in metals or compositions containing metals such as aluminum, lead or zinc, or low melting alloys.

Schreffler U.S. Pat. No. 3,222,151 discloses using glass flake for reinforcing asphalt emulsions and to a combination of bentonite clay in such asphalt emulsions, but with such flakes the solvent has difficulty in emerging from the emulsion. He also suggests the use of glass flake to reinforce polyolefins to produce blown containers.

Ellis U.S. Pat. No. 2,115,667 has proposed a glass cloth on narrow tape-like strips of glass ribbon as a reinforcement for bituminous road material.

Frick U.S. Pat. No. 2,578,883 shows glass or rock wool, asbestos with pitch for building purposes including roof or street coating. Zaadnoordijk shows various fibrillary products including glass in laminates, road foundations, pavements, roofing, and the like.

Farris U.S. Pat. No. 2,712,506 shows the use of glass fiber bonded mat combined with asphaltic emulsion for roofing, pipe wrap, and the like.

Draper et al. U.S. Pat. No. 3,474,625 discloses laminates of polyolefin fabrics or fibers and asphaltic material in roadways.

Defregger U.S. Pat. No. 3,615,804 proposes a street covering mix comprising mineral fibrous materials such as asbestos, glass wool and basalt wool with bituminous wetting agent, and mineral materials.

Kietzman U.S. Pat. No. 3,870,426 shows a method for sealing the top surface of pavements utilizing an impermeable membrane comprising asbestos fibers, asphalt, and relatively fine aggregate.

DRAWINGS

DESCRIPTION OF THE INVENTION

Figure 1:
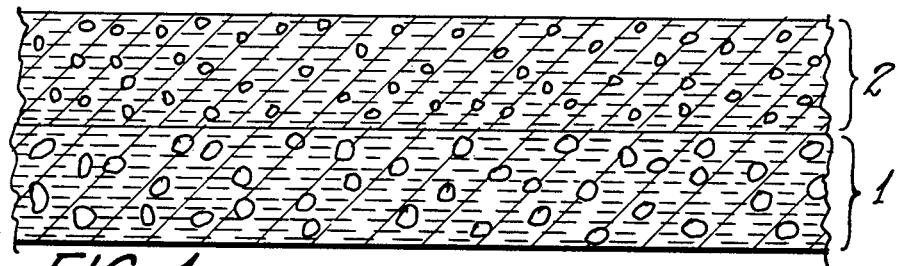
FIG. 1 is a schematic view of a cross section of a road construction consisting of a substrate layer and a wear course embodying the present invention.

FIG. 1 shows a substrate layer 1 of any suitable substance such as wood or steel deck or a concrete bed or a suitable asphalt aggregate as, for example, one composed of 94% aggregate and 6% asphalt (as illustrated schematically); the aggregate in this case being relatively coarse up to approximately ½ inch in diameter. In the case of bridges wood or steel decks may be encountered, and in the case of a wood deck they may be supported with steel-reinforced cement or with steel structural members. Overlying the substrate layer 1 is a wear course 2 with a thickness about two inches to four inches thick. The wear course is composed of any suitable aggregate and asphalt mix that would meet the specifications of the particular state in which the wear course is applied. For example, in the state of Ohio a standard specification is known as M-404, comprising approximately 51.6% sand, 42.2% stone, screened gravel or crushed stone about ⅜ inch in diameter, and 6.2% AC20 asphalt. To this mix is added from 0.5 to 10%, preferably about 0.75 to 1%, glass flake having a thickness of 0.0003 to 0.0004 inch, preferably about 0.00035 inch, and having an average diameter or size which is irregular of about 0.01 to 0.2 inch, preferably 0.0156 to 0.125 (1/64 to ⅛) inch.

The procedure for mixing is to charge the sand and aggregate in a pug mill and then add unopened bags of glass flake. Thereafter, the asphalt is charged and the material is mixed. The composition is then dumped on the road, spread, and rolled.

Asphalt paving mixes may be produced from a wide range of aggregate combinations, each having its own particular characteristics and suited to specific design and construction uses. Aside from the asphalt content, the principal characteristics of the mix are determined, in the main, by the relative amounts of coarse aggregate, retained on sieve #8; fine aggregate, passing #8 sieve; and mineral dust, passing #200 sieve. The description, principal usage, and paving applications for the complete series of mixed compositions are outlined in detail in "Specifications and Construction Methods for Asphalt, Concrete and Other Plant-Mix Types (SS1)," published by The Asphalt Institute. Table IV10, published in the Asphalt Handbook by The Asphalt Institute, April, 1965 edition, contains a summary of these recommended mix compositions. The Asphalt Institute recommends that the temperature/viscosity relationship for each asphaltic material be taken into consideration to arrive at the proper temperature and to give the desired viscosity for the construction operation being used. Table IV13 in the Asphalt Handbook lists suggested temperatures for uses of asphalt.

The asphalt may be blown or not blown. Said asphalt may be reacted by free radical mechanism with one or more unsaturated monomers or with an unsaturated monomer or mixtures thereof and an unsaturated elastomer or mixtures thereof. Examples of saturated monomers are styrene, vinyl toluene, vinyl acetate, butyl acrylate, or the like which are not inhibited from reaction by the presence of the asphalt. Examples of the unsaturated elastomers are polybutadiene, styrene butadiene elastomers, polychloroprene, and the like.

The intermixture of flake glass particles provides interparticle reinforcement. The flake glass composition has a preferred average diameter of approximately ⅛ inch and at least 1/64 inch. Its content can be from ½ percent to 80 percent based on the organic phase. It is preferred, however, to have ½ to 20% by weight based on the organic phase which are otherwise highly filled. In the event the system is lightly filled or non-filled, the preferred range of flake glass would be 10 to 50%. The organic matrix may be tars, pitches, or asphalts whether blown, fluxed, or modified by chemical reaction or physical addition of other organic or inorganic substances. The fillers may be any suitable filler such as clays, gravel, sand, aluminum hydrate, calcium carbonate, carbon black, etc.

The addition of flake glass improves properties such as strength, creep, permeability, oxidation resistance of the asphaltic compositions.

Asphalt aggregate systems containing flake glass in the asphalt component restrain the flow of asphalt or modified asphalt, thus tending to immobilize the aggregate-asphalt so they will not separate from each other. In this way the stability of the system is maintained.

We have discovered that the combination of asphalt and aggregate with glass flake does not impair or destroy the glass flake; that is, the coarser aggregate, sand, and the like do not grind to destruction the glass flake. Thus, the glass flake can continue to provide a useful function in stabilizing the composite as well as cntributing to the resistance to oxidation.

The addition of glass flakes having a small diameter or size which is non-uniform will act as a reinforcement by introducing a high modulus material to the matrix substances restricting flow and compression. In systems which are filled with coarse fillers such as sand or gravel the glass flakes will release the modulus of inter-filler particle asphalt bridges. Because of the high flat surface area, the glass flake contributes to the development of an inorganic barrier against permeation by liquid or gases, thus resulting in less damage to substrate or matrix materials, for example, water freeze and thaw cycling, oxidation, ozone degradation, rusting, and the like. The glass surface also adsorbs low molecular weight oils, further immobilizing the asphalt.

As a specific example of a pavement overlaying a bridge deck utilizing a form of the foregoing description of the invention applied over a corrugated sheet steel bridge deck, a base course of asphalt aggregate approximately 1½ inches to 2 inches thick having from 0.5 to 10% glass flake incorporated in the organic asphalt matrix, preferably 1% by weight over which a wear course of approximately 1½ inches to 2 inches thick composed of asphalt aggregate, similar to the base course except with a finer grade of aggregate, also having from 0.5 to 10%, preferably 1%, of glass flake inter-mixed in the organic asphalt matrix. The asphalt aggregate of the base course and the wear course can each be made to standard specifications called for by the local authorities, although a typical aggregate would be composed of 51.6% sand, 42.2% stone, screen gravel or crushed stone about ⅜ inch in diameter, and 6.2% AC20 asphalt. The admixture of the glass flake serves to prevent migration of the aggregate to the surface in the wear course and helps prevent or impedes the passage of oxygen to oxidize and weaken the pavement. The glass flake also prevents or impedes water or other fluid from descending through the asphalt aggregate in both the wear course and the base course to reach the bridge deck and cause corrosion thereof.

Figure 2:
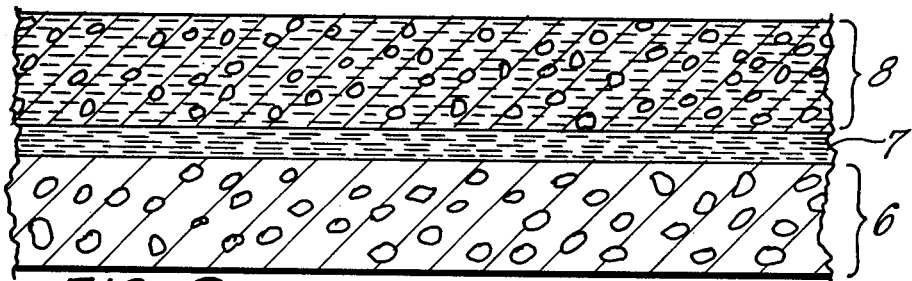
FIG. 2 is a schematic view of a cross section of a road construction incorporating a modified embodiment of the present invention.

FIG. 2 represents a modified embodiment of the invention wherein the substrate layer 6 which is similar to the various alternative structures described for the substrate layer 1 of FIG. 1, has overlying it an asphaltic, glass flake membrane 7 approximately ⅛ to ½ inch thick, serving to help prevent the flow of water or other fluid to the substrate layer 6, thus protecting it against corrosion or other degradation and that of any underlying steel bridge structure or supporting members that may be involved. The interface layer being provided with glass flake reinforces the composition to provide additional compressive strength, resilience, and lateral strength to assist in stress distribution and decoupling the movement of the wear surface 8 from the substrate layer 6. The wear course 8 may be similar in structure to that described for the wear surface 2 shown in FIG. 1.

Such interface membrane 7 may be provided with rubberized asphalt or asphalt having cross-link binders of varying composition. The particles of glass flake described above may be added in the range of 10 to 50% of the asphaltic system if lightly filled or non-filled. The organic matrix may be tars, pitches, or asphalts which may be blown, fluxed, or modified by chemical reaction or physical addition of other organic or inorganic substances. The fillers may be any suitable filler such as clay, gravel, sand, aluminum hydrate, calcium carbonate, carbon black, etc. The particles of glass flake may be mixed with hot asphalt or hot elastomer modified asphalt and then squeegeed or sprayed on the surface of the substrate 6.

Figure 3:
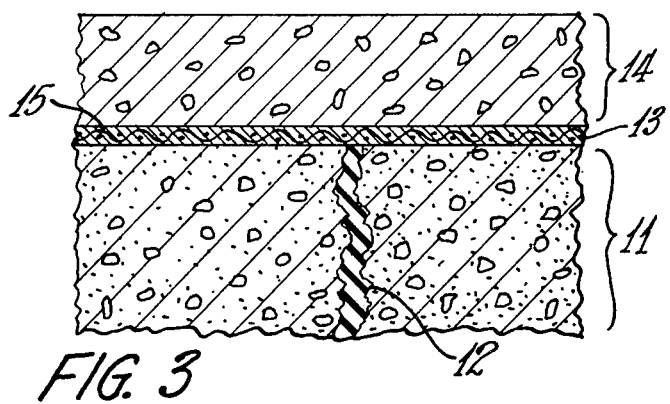
FIG. 3 is a schematic view of a cross section of a road construction that has been applied to a repair of an existing cracked sub-surface.

FIG. 3 shows a substrate layer represented by reference numeral 11 of any suitable substance such as a wood or steel deck or, as shown, a concrete bed having a crack 12 which may have been generated through a prior use. Over this substrate 11 we have provided an interface layer 13 of reinforced asphaltic composition at least ⅛ inch to about ½ inch thick. Over the interface layer 13 is applied the wear course 14 consisting of asphalt aggregate composition of a standard mix or a modification of this mix including a modified asphalt composition prepared from 60 to 99.8% AC20 specification asphalt; 0.1 to 35.0% styrene monomer, and 0.1 to 5.0% of butadiene rubber. The monomer and rubber are added to the hot liquid asphalt and reacted from about 16 to 24 hours.

This composition may be sprayed or poured and squeegeed onto the deck or substrate layer. Embedded in the interface layer is a glass flake or glass flake and glass fiber reinforcement 15 (shown schematically) which can be a glass fiber chopped strand mat or continuous strand mat. The glass fiber reinforcement in the layer 15 can also be in the form of chopped fibers or chopped strands which may be sprayed and rolled into the composition or mixed initially with the inter-mixture of the hot asphalt composition. Although the drawings show the glass fiber reinforcement schematically in the form of a woven product, it is also intended to represent the fiber or strands thereof in random distribution or in the form of a mat or scrim fabric.

Before the application of the interface layer 13 on the substrate 11, the crack 12 can be filled with rubberized asphalt. If the crack is over ⅛ inch across, rubberized asphalt is preferably reinforced with 0.5 to 10% flake glass, or such flake glass and 0.5 to 5% milled glass fibers to assist in its rigidification and resistance to flow out of the crack during use. The asphalt may be a standard road asphalt such as the AC2C specification which can be modified with 0.1 to 35.0% styrene monomer and 0.1 to 5.0% butadiene rubber.

The foregoing structure provides an interface layer of sufficient thickness along with compression strength, resilience, and lateral strength to assist in stress distribution. This way it impedes the generation of reflection cracking from the cracks in the substrate into the wear surface layer.

The interface layer 13, because of its thickness of at least ⅛ inch and particularly because of the reinforcement, serves to decouple the substrate layer 11 from the relative movement of the wear surface 14. In this way stresses from such movements as well as concentrated stresses from road traffic are more dispersed and distributed, thus minimizing reflection cracking and deterioration of the wear surface.

Figure 4:
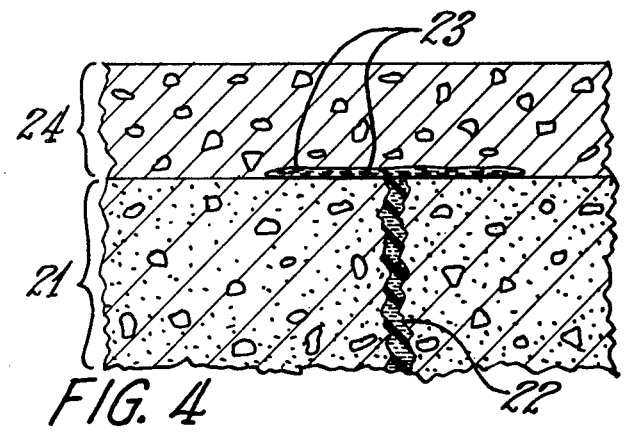
FIGS. 4 and 5 are schematic cross-sectional views of modified embodiments of the present invention.

FIG. 4 shows a substrate layer 21 similar to that of substrate layer 11 of FIG. 3. This also may have a crack 22 similar to that of the crack 12 of FIG. 3. This crack 22 may also be filled with rubberized asphalt and if above ⅛ inch approximately the rubberized asphalt may be reinforced with glass flake or flake glass and milled glass fiber. Over the cracks is dusted a layer of about 1/16 inch of glass flake 23 to provide a multi-layer thickness of slip planes. Then over the substrate layer and the glass flake 23 can be applied the wear course 24 of asphalt aggregate in a normal manner. The glass flake 23 may be incorporated between sheets of polyethylene film or in a flat bag or tube so as to assist the application of the layer of flake over the crack. This layer may be approximately three to five inches wide to fit conveniently over the crack. The film then on top and bottom of the flake layer will help prevent the asphalt in the crack to flow upwardly into the flake 23, or the asphalt in the wear layer to flow downwardly into the flake, thus assisting in maintaining its mobility toward lateral movement. The glass flake 23 serves to decouple the forces of movement between the substrate layer 21 and the wear surface 24 and thus assist in distribution of stresses that are induced due to such movement caused by temperature changes, earth movement, or road traffic forces.

Figure 5:
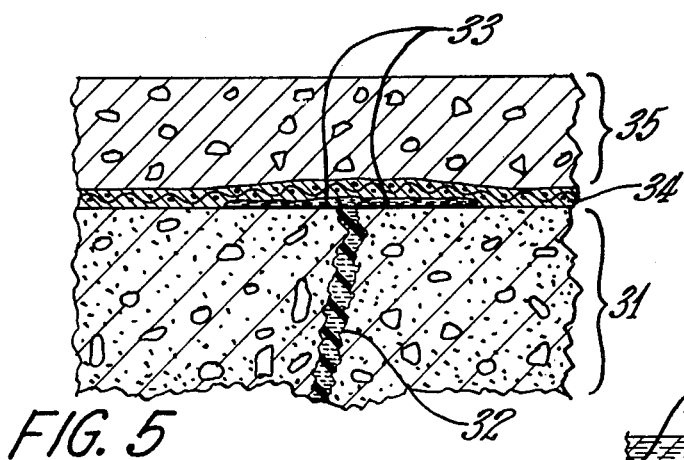

FIG. 5 shows a substrate layer 31 which may or may not have a crack 32 therein which may be filled with rubberized asphalt or rubberized asphalt reinforced with glass flake or glass flake and milled glass fiber. Over the rubberized asphalt filling the crack 32 is sprinkled a layer of flake glass 33. This layer is similar to that described in FIG. 4 and also may have a layer on top and bottom of polyethylene film to help prevent bleeding of asphaltic compositions into the flake glass 33. Over the substrate layer 31 and the sprinkling of flake glass layers 33 is an interface layer 34 at least ⅛ to ½ inch thick similar to the interface layer 13 described in FIG. 3. Over the interface layer 33 is applied the wear course 35. The interface layer 34 and the flake glass layer 33 serve to decouple the substrate layer from the overlying wear surface to enable the wear surface and substrate layer to move independently and assist in the distribution of stresses from the upper to the lower layers.

Figure 6:
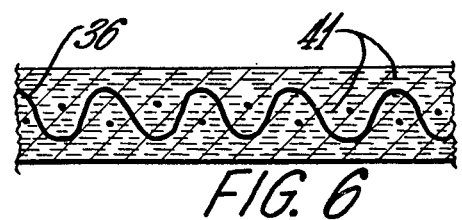
FIG. 6 is a schematic cross-sectional view of an interface layer embodying a feature of the present invention.

FIG. 6 shows an asphaltic, glass flake membrane showing predominate orientation of the glass flake and the subsequent barrier development. The membrane may be approximately ⅛ to ½ inch thick, the particles of glass flake 41 may be mixed with hot elastomer modified asphalt as described above and then squeegeed or sprayed on the surface of a substrate as, for example, those shown in FIG. 2 in place of the membrane 7 thereof or the interface 34 shown in FIG. 5. Over this membrane may be applied a wear course such as those described above in the normal manner as, for example, those shown in FIGS. 1, 2, 3, or 4. The flake glass 41 may be supplemented by the addition of glass fiber reinforcement 36. The glass fiber reinforcement may be similar to that described for the interface 13 of FIG. 3 or the interface 34 of FIG. 5 supplemented by the addition of flake glass in the same manner as described for FIG. 6 or other suitable methods of incorporation.

A preferred reinforcement for asphaltic compositions are very short milled fibers either by hammer or ball mill. Previous attempts to reinforce asphaltic compositions with chopped or milled fibers have been counterproductive as the high modulus fibers have excellent memory and will tend to return to linear shape in soft matrices such as asphalt, causing increased void content and general decrease in strength properties. Fibers maintain a filament nature where the length is about 100 times or more than the diameter. In samples of composites when subjected to compression, the long glass fibers are deformed, and when compression is relieved, these fiber will tend to return to straight configuration and cause voids and loosening of the mix. However, with the addition in the mix of large aggregate of ½" average diameter or more, this tendency is diminished or even eliminated. Accordingly, it is preferable to use very short filamentized glass fibers to produce the asphaltic compositions with improved strength. Final maximum length should preferably average less than 1/64 inch or 0.01 inch or even less. For highly filled asphaltic compositions such as asphalt concrete, the ranges of microfiber of the foregoing type based upon total composition weight are approximately 0.12 to 2.0 with a preferred range from 0.3 to 1.5%. For non-filled systems such ranges are 0.1 to 90% with a preferred range of 1 to 10%.

Another feature of the invention is restricting the movement of aggregate in the surface layer by the use of cross-linked binders to reduce or eliminate the flowable asphalt and thus assist in the immobilization of the asphalt and asphalt aggregate. Asphalt is composed of saturated hydrocarbons and a family of unsaturated ring-type structures known as asphaltenes. Oxidation of the asphaltenes at elevated temperatures, 400–500 F, in the presence of catalysts such as ferric chloride or phosphate ions will result in not only oxidation of the double bonds to aldehydes, ketones, acids, etc., but also in the formation of carbon-to-carbon bonds (cross-linking). The product which results from this reaction is an asphalt with increased hardness and brittleness, decreased flowability, and improved weathering. This process is known in the trade as blowing, and the asphalt produced designated as blown asphalt. Our invention is directed to these double bonds reacting them with an unsaturated monomer or low molecular weight polymer including elastomers. The product desired is a low viscosity material which can be used as an impregnant for glass flake with or without a glass fiber mat or roving or other reinforcement for road or bridge surfaces. Cross-linking of the polymer will follow normal vulcanization techniques involving both a vulcanizing agent and an accelerator. Following such reaction, adhesion to glass fibers can be effected by either amino, mercapto, or glycidoxy silanes. Butadiene monomer, an unsaturated monomer, or low molecular weight polymer including other elastomers may also be used with sufficient catalyst or initiator such as free radical formers, organo-metallics, or alkylation catalysts.

The glass flake that is described for use in FIGS. 1 to 6 as a reinforcement for the asphaltic compositions may be surface treated to chemically alter the glass so that chemical bonding may occur between the glass surface and the asphaltic matrix resin. The surface treatment and subsequent chemical bonding will enhance the reinforcement properties and those relating to permeability or attack by oxidation or liquid penetration as, for example, water or salt water. Thus, the matrix and substrate underneath will be significantly protected by such reinforcement. The surface treatment may be a silane coupling or anchoring agent either alone or in combination with a polymeric material which are compatible with both the coupling agent and the matrix resin, that is, asphalt, tar, and the like which are processable. The ranges for the use of the coupling agent are from 0.05 to 15.5% based on polymer glass coupling agent total weights with a preferred range from 0.1 to 2%. Ranges for the polymeric material may be from 0 to 40% with a preference between 2 to 25% based on the polymer glass coupling agent total weight. While many types of coupling agents may be satisfactory such as chromium compounds, titanium complexes, and zirconium compounds the amino silane should offer outstanding bonding properties for both the glass and the matrix.

The surface of the glass flake of the structure shown in FIGS. 3, 4, and 5 and the milled glass fiber of FIGS. 4 or 5 may be modified to produce disulfide linkages on the surface which may be reacted in a number of ways with matrix resin. The disulfide linkages may be prepared in one of the following alternate methods. In one method the glass fiber or flake may be treated with a mercapto silane and subsequently treated with the free sulfur or sulfur containing moitys to produce a surface containing mercapto groups or disulfide linkages. The glass is then introduced into the resin system. Subsequent heating can produce reaction with the sulfur by means of the mercapto groups joing disulfide linkages which react into the resin via vulcanization or other reaction. As an alternative, the treated glass may be heat treated to form disulfide functionality prior to mixing with the resins system. In either case the loading will enhance the properties of the system.

In systems in which aryl alkyl ketones are present, it is possible to react these ketones in the presence of sulfur and primary and secondary amines to produce a new chemical variety. This results in bonding between the glass surface and the matrix resin. The glass flake or glass fibers may be treated directly on and at the point of manufacture or subsequently with a mixture of amino silane and elemental sulfur to produce a glass surface in which the silane portion of the coupling agent has reacted with the glass. This leaves unreacted secondary or primary amine groups as well as free elemental sulfur dispersed over the glass surface. When this treated glass is added to a resin system such as asphalt, tar, etc., in which alkyl aryl ketones are present the Kindler modification of the Willgerodt reaction occurs to produce $Ar(CH_2)_nCSNR_2$ where one or both R's are silane linked to the glass surface. The resulting direct bond of the glass should improve strength and impermeability properties of the matrix. Additionally, the matrix resin should be significantly reduced in mobility. This feature of the invention may be applicable to unfilled systems such as bridge decking, sealers, coatings, etc., as well as filled composites such as asphalt concrete and the like. The ranges of the silane compounds would range from 0.05 to 10% by weight based on resin, glass flake, and silane with a preference for 0.1 to 7.0%. The sulfur content may be from 0.05 to 40% with a preference from 0.1 to 7%. The glass flake surfaces of the compositions shown in FIGS. 1 to 5 may also be modified by the incorporation of sulfur into the glass surface which results in active sites for the making of bonds with certain matrix resins. The flake or fibrous glass can be reacted directly with sulfur on the glass surface while still very hot. At 300-400 F. the reaction is extremely fast if the glass has been protected against oxidation and moisture. The reaction can in fact be run at room temperature if the surface is pristene. The resulting disulfide functionality is stable but will react readily with a vulcanizable resin or rubber matrix or with, for example, the asphaltene portion of the asphalt. The resulting bonding should greatly enhance the properties of the composition. Alternately, the pristene glass could be reacted with $H_2S$, the temperature being dependent on the cleanliness of the glass surface. However, this produces Si—SH (mercapto) bonds. Therefore, this Si—SH glass surface should be further reacted with sulfur to again produce the stable S—S disulfide bond. The sulfur content in the glass surface as a percent of glass by weight may be from 0.05 to 10% and preferably within the range of 0.1 to 7%.

It is also a feature of the invention as a modified embodiment to modify the asphaltic compositions of the inner layers 13 of FIG. 3, 34 of FIG. 5, and the compositions of FIG. 6 by adding certain elastomeric polymers to the asphaltic type materials. The polymers to be added may consist of dehydrohalogenated chlorobutyl elastomer. The degree of dehydrohalogenation may vary. An example of this class of polymer is CDB-411S-10S prepared by Exxon Chemical Company. This class of polymers can also undergo diehls-ALDER condensation more readily than, for example, polybutadiene thus providing versatility for a wide range of possible modifications of the asphalt. The ranges of this compound to be added to non-filled asphaltic systems, that is, asphalts, tars, or pitches, may range from 0.3 to 15% with preference between 0.5 to 10%. For filled systems the ranges may be from 0.1 to 10% with preference between 0.2 and 7.5%. The elastomer may bond to asphaltic constituents through diehls-ALDER condensation. Additionally, Dienophiles such as maleic anhydride or cyclopentodiene may also be reacted into the composition. As another alternative for increasing the bonding between the matrix resin and glass reinforcement of glass flake or glass fiber may be accomplished by joining sulfur linkages between the glass through a coupling agent and the resin. In this case the surfaces of the glass flake or fibrous glass are treated with a mixture or dispersion of elemental sulfur, an accelerator as, for example, zinc dithiocarbonate or the like to open the sulfur rings and a coupling agent containing vulcanizable unsaturation, for example, vinyl triethoxysilane. The resulting glass surface contains bond coupling agent with pendant vulcanizable groups, elemental sulfur, and accelerator. When introduced into the resin systems and heated, one end of a sulfur linkage can be formed by vulcanizing the pendant groups on the coupling agent. The other end of the link can be bonded to the matrix resin via vulcanization for elastromeric materials or other vulcanizable materials. For asphalt the resin may be bonded not by vulcanization but by direct reaction of sulfur with asphaltene components. The resin, therefore, may be any vulcanizable material as, for example, SBR, polybutadiene rubber, or the like or modified asphalt. The resulting bonds will increase the dynamic properties of the system as well as decrease oxidation, permeability, and flow. The ranges for the sulfur are 0.05 to 40% with a preferred range of 20 to 30%, the accelerator may be in the range of 0.05 to 1% with a preferable range from 0.1 to 0.7%, and the coupling agent may be from 0.05 to 10% with a preferable range from 0.1 to 7%.

It will be understood that various modifications and changes can be made in the details of construction, formulation, and use without departing from the spirit of the invention, especially as defined in the following claims.

We claim:

1. A method of repairing a crack in a substrate concrete layer of a road pavement comprising filling the crack with a composition composed of rubberized asphalt and 0.5 to 10% glass flake and applying a thin layer approximately 1/16 inch of glass flake over the upper surface of the substrate layer adjacent the crack and over the said composition to provide a multi-layer thickness of slip plane for movement of overlying courses of the pavement.

* * * * *